Nov. 18, 1969   R. E. BIDWELL ET AL   3,478,452
VISUAL AID FOR GOLF
Filed Dec. 7, 1967

INVENTORS
ROBERT E. BIDWELL
SIDNEY MISHKIN

BY *Larson and Taylor*

ATTORNEYS

United States Patent Office

3,478,452
Patented Nov. 18, 1969

3,478,452
VISUAL AID FOR GOLF
Robert E. Bidwell, 27 Montrose Place, Huntington, N.Y. 11743, and Sidney Mishkin, 130 Chestnut Drive, Roslyn, N.Y. 11576
Filed Dec. 7, 1967, Ser. No. 688,946
Int. Cl. G09f 11/04; A63h 33/26
U.S. Cl. 40—68                                             10 Claims

ABSTRACT OF THE DISCLOSURE

A tamper-proof visual indication device for a golf course to be located at each tee comprising an enclosed housing containing a three-dimensional representation of the particular golf hole and a changeable yardage marker. The yardage marker comprises numbered wheels with a magnet associated with each number which may be viewed when moved to a viewing position. Control of the rotation of the wheel and thus of the positioning of the numbers is effected by a permanent magnet completely separate from the device housing. A holding magnet holds the wheel in a fixed position in the absence of the control magnet.

---

The present invention relates to visual indication devices and more particularly to magnetically controlled visual indication devices.

On golf courses, because of wear on the turf, it is necessary from time to time to change the positions of the tees with respect to the holes. With these changes, the distances between the hole and tee change and thus the length of a particular hole may vary substantially. It is essential that the golfer have this information.

The present invention is directed toward providing a visual aid for golfers which may be variably set to give an indication of the length of a particular hole. Visual aids of this type must have certain characteristics. For example, such devices must be rugged, of reatively simple construction and generally tamper-proof while being capable of easy adjustment by the greenskeeper or by any other designated individual.

These characteristics are achieved in the device of the present invention by providing an indicator wherein magnetic control of an indicating mechanism is effected by means completely external of and separate from the mechanism housing. In accordance with a presently preferred embodiment of the present invention, a rotary wheel member mounts the visual information to be presented. Permanent magnets are located at spaced positions or stations about the periphery of the wheel corresponding to each item of information. A magnetic holding means in the form of a permanent magnet oppositely polarized to those mounted on the wheel serves to hold or lock the wheel in the desired position. The wheel mechanism and associated magnets are completely enclosed within a housing and are physically inaccessible from the outside thereof. Control of the position of the wheel is effected through the utilization of an externally located magnetic means which comprises a permanent magnet oppositely polarized to those located about the periphery of the wheel. By stroking the external magnet over the surface of the housing a change in the position of the wheel and thus in position of the visual information carried thereby may be effected.

Figure 1:
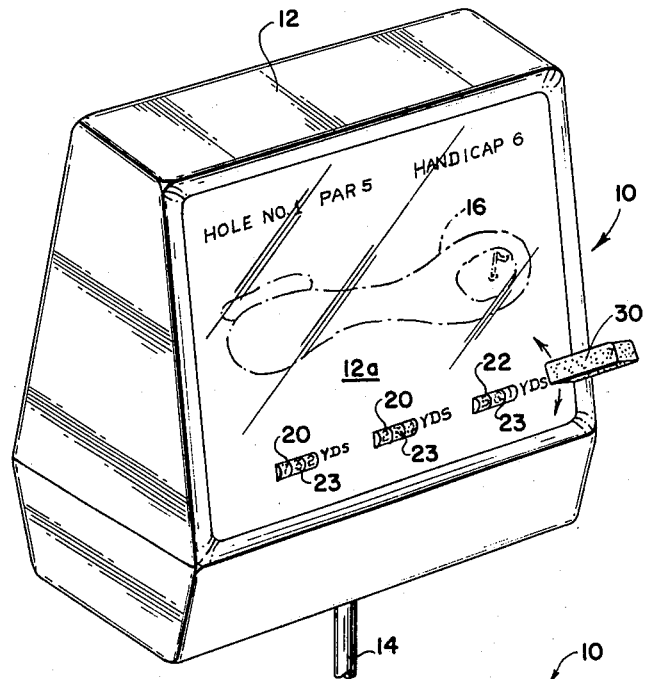
Figure 3:
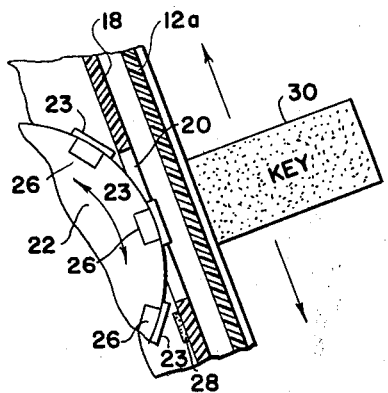
Figure 2:
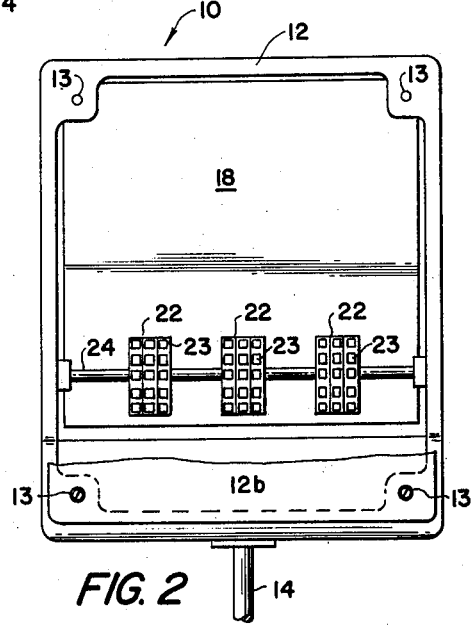

Other features and advantages of the present invention will become apparent from the following description of the drawings wherein:

FIGURE 1 is a perspective view of a presently preferred embodiment of the invention, FIGURE 2 is a rear view of the device of FIGURE 1 with a portion of the back cover removed, and FIGURE 3 is a detail view partially in section of the operating mechanism of the device of FIGURE 1.

Referring to FIGURE 1 of the drawing a visual indicating device generally denoted 10 comprises a housing 12 supported by a support post 14. Post 14 may be manufactured of any suitable material such as aluminum. Housing 12 is preferably constructed of the plastic "Lexan" although other materials having similar characteristics may be used. "Lexan" is particularly suited for use because of its durability and impact strength.

Indicator device 10 further includes a three dimensional plastic visual aid 16 mounted on a generally flat member 18 (see FIGURE 3) which is located in a position recessed from the front surface 12a of the housing 12. Visual aid 16 depicts the layout of the particular hole showing the general configuration thereof together with the locations of traps, trees and the like. The front surface 12a of the housing 12 is vacuum-formed and is constructed of transparent "Lexan." Thus the housing 12 is opaque except for the front surface 12a which is transparent so that the visual aid material may be viewed. Member 18 may, of course, contain other information such as the number of the hole and par for the hole. Housing 12 further comprises a back cover 12b (shown with a portion removed in FIGURE 2) which is removably secured to the back of the housing by a plurality of screws 13.

As can best be seen in FIGURES 1 and 3 taken together, a series of openings 20 in member 18 permit viewing of a portion of the information carried on circular wheels 22. In the embodiment of the invention being described, wheels 22 each carry digits 0, 1, 2, 3, 4, 5, 6, 7, 8, 9 and the three wheels may be rotated by an external magnetic "key" 30 described below so as to show yardage from 0 yards to 999 yards. In another example, assuming that the length of a hole may vary by fifty yards and that the wheels 20 carry eleven separate numbers formed by the three digits, the numbers could be arranged to differ by a factor of five as they progress between the minimum and maximum value. Of course numerous other combinations are possible.

Numbers 23 are equally spaced about the circumference of the wheels 22 and are located on the outer peripheral surface of the wheels 22 as shown. Three wheels 22 are shown in FIGURE 1 which correspond to the length of the hole from tee to cup in yards for ladies, for men and for championship play.

Wheels 22 rotate within housing 12 about an axle 24 (see FIGURE 2) mounted between the side walls of the housing. As shown in FIGURE 3 a plurality of like-polarized permanent magnets 26 are each mounted behind individual numerals 23 at positions equally spaced around the periphery of wheel 22.

The position of magnets 26 and thus of corresponding numbers 23 is controlled by an external magnetic "key" means in the form of a permanent magnet 30. Magnet 30 is oppositely polarized to the magnets 26 and thus will attract them. For example, the outer face of magnets 26 may be north poles while the adjacent end of magnet 30 may be a strong south pole. Thus by holding magnet 30 in one's hand and by stroking it over the surface 12a of the housing 12, wheels 22 may be individually rotated about axle 24 and the positions or settings of numerals 23 may be varied. Wheels 22 are spaced far enough apart so that they may be individually adjusted. Similarly, magnets 26 are spaced about the periphery of wheels 22 so that they may be individually controlled by magnet 30 thereby effecting step-by-step advancement in either direction of the numerals 23. Magnet 30 is completely separable from the indication device 10 and may be stored or carried by an authorized individual when not being used.

A relatively weak holding magnet 28 located on the inner surface of member 18 serves to hold or lock the magnets 26 into position. Magnet 28 is located in close proximity to the path of travel of wheel 22 and is polarized oppositely to magnets 26 so that the magnet 26 opposite magnet 28 is attracted thereby. In this way the positions of the numerals 23 are fixed, with the next numeral to that opposite magnet 28 appearing at opening 20. Although magnets 28 and 30 are like-polarized, magnet 30 is much stronger than magnet 28 and thus the effect of magnet 30 overrides that of magnet 28 and controls the position of wheel 22. With magnet 30 removed the position of wheel 22 dictated by magnet 30 at the time of its removal is held by magnet 28.

It will be appreciated from the foregoing that the positions of numerals 23 can be adjusted only through the use of key or control magnet 30. Because the visual aid 16 and numerals 23 are completely enclosed with housing 12, tampering therewith is substantially precluded. Only authorized personnel such as the greenskeeper will have access to a control magnet and thus adjustments can only be made by such persons. In this regard a completely separable control mechanism is vastly superior to a similar device which is mechanically or electrically operated by a push button or the like at the locus of the device. Further, by completely enclosing the visual aid and indicating mechanism wear from weathering and the like is precluded. The device of the present invention is also obviously very rugged and durable.

It would be appreciated that the present invention is adaptable to ther environments than that specifically disclosed and is particularly suitable for usage in situations where visual information to be presented is exposed to possible tampering or rough use.

It will be further understood by those skilled in the art that the embodiment of the invention shown and described herein is subject to various modification without departing from the scope and spirit of the invention. Accordingly, it should be understood that the invention is not limited by the exemplary embodiment shown and described but rather only by the subjoined claims as construed in light of the foregoing specification and drawings.

Having thus described our invention in accordance with the patent statutes, we claim:

1. A visual indication device comprising unitary enclosed structure comprising at least one rotary member, a plurality of magnetic elements located on said rotary member, and a plurality of items of information capable of being individually viewed also located on said rotary member, each item of information being associated with individual of said magnetic elements, and magnetic means completely separated from and external of said enclosed structure for cooperating with said magnetic elements to control the rotation of said rotary member and to thereby control the positions of said items of information whereby variation in the information items viewed may be effected.

2. A device in accordance with claim 1 wherein said enclosed structure further comprises further magnetic means located in proximity to the path of travel of said rotary member for holding the position thereof in the absence of said external magnetic means.

3. A device in accordance with claim 1 wherein said external magnetic means consists of a single permanent magnet movement of which controls the position of said rotary member.

4. A device in accordance with claim 3 wherein said magnetic elements comprise permanent magnets, said magnets being like-polarized and equally spaced around the periphery of said rotary member and wherein said external magnet is oppositely polarized to said permanent magnets.

5. A device in accordance with claim 4 wherein said enclosed structure further includes a further permanent magnet located in proximity to the path of travel of said rotary member for fixing the position of said member in the absence of said external magnet.

6. A device in accordance with claim 4 wherein said enclosed structure inclosed a mounting member located within the outer surface of said enclosed structure and visual aid means mounted on said member, said mounting member including at least one opening therein for permitting viewing of the information carried by said rotary member.

7. A device in accordance with claim 4 wherein the outer walls of said enclosure structure are constructed of "Lexan" and wherein a portion of the walls are transparent.

8. A device in accordance with claim 7 wherein said enclosure includes three individually controllable rotary members and wherein the information carried thereby is the length of a golf hole from tee to cup corresponding to three different classes of golfers.

9. A device in accordance with claim 1 wherein said rotary member comprises a circular wheel, said items of information comprising numerals equally spaced about the circumference of said wheel on the outer peripheral surface; and said magnetic elements comprising a permanent magnet adjacent to an internal of said numerals.

10. A device in accordance with claim 1 wherein said items of information may be seen from the outside of said enclosed structure but are located in a position internal of the outer surface of said structure, said information items, rotary member and magnetic elements being physically inaccessible from outside the enclosed structure.

References Cited

UNITED STATES PATENTS

| | | |
|---|---|---|
| 611,545 | 9/1898 | Yarnall. |
| 807,927 | 12/1905 | Henwood _____ 40—69 X |
| 1,832,947 | 11/1931 | Sears et al. _____ 40—68 |

EUGENE CAPOZIO, Primary Examiner

W. H. GRIEB, Assistant Examiner

U.S. Cl. X.R.

46—239